United States Patent
Wang et al.

(10) Patent No.: US 9,128,793 B2
(45) Date of Patent: Sep. 8, 2015

(54) METHOD, SYSTEM AND SERVER FOR DOWNLOADING INSTALLATION PACKAGE

(71) Applicant: Tencent Technology (Shenzhen) Company Limited, Shenzen (CN)

(72) Inventors: Jinhua Wang, Guangdong (CN); Ke Hu, Guangdong (CN)

(73) Assignee: Tencent Technology (Shenzhen) Company Limited (CN)

( * ) Notice: Subject to any disclaimer, the term of this patent is extended or adjusted under 35 U.S.C. 154(b) by 0 days.

(21) Appl. No.: 14/316,034

(22) Filed: Jun. 26, 2014

(65) Prior Publication Data

US 2014/0344803 A1  Nov. 20, 2014

Related U.S. Application Data

(63) Continuation of application No. PCT/CN2013/090322, filed on Dec. 24, 2013.

(30) Foreign Application Priority Data

May 14, 2013 (CN) .......................... 2013 1 0177771

(51) Int. Cl.
*G06F 9/44* (2006.01)
*G06F 9/445* (2006.01)

(52) U.S. Cl.
CPC .. *G06F 8/61* (2013.01); *G06F 8/60* (2013.01); *G06F 8/65* (2013.01); *G06F 8/67* (2013.01)

(58) Field of Classification Search
CPC .............. G06F 8/60; G06F 8/61; G06F 8/65; G06F 8/67; G06F 8/68
See application file for complete search history.

(56) References Cited

U.S. PATENT DOCUMENTS 8,630,981 B1 * 1/2014 Chirhart et al. ............... 707/625
8,850,422 B2 * 9/2014 Chang ........................... 717/174
(Continued)

FOREIGN PATENT DOCUMENTS

CN  101395580 A  3/2009
CN  102231117 A  11/2011
(Continued)

OTHER PUBLICATIONS

Zhipeng et al., "Controlling Symbol Visibility for Shared Libraries: Part 1—Introduction to symbol visibility", Jun. 12, 2013, IBM Corporation, pp. 1-15; <http://www.ibm.com/developerworks/aix/library/au-aix-symbol-visibility/>.*

(Continued)

*Primary Examiner* — Thuy Dao
*Assistant Examiner* — Ben C Wang
(74) *Attorney, Agent, or Firm* — Brinks Gilson & Lione

(57) ABSTRACT

A system, a method and a server for downloading installation package are provided. The method for downloading installation package comprises the steps of receiving request information for downloading installation package from a hardware client, acquiring the installation package and a dynamic link library related to the installation package upon the receipt of the request information for downloading the installation package, compiling the dynamic link library that has been acquired to reduce a size of the dynamic link library, packing the dynamic link library and the installation package, wherein the size of the dynamic link library has been reduced, and transmitting the dynamic link library and the installation package to the hardware client.

18 Claims, 4 Drawing Sheets

(56) References Cited

U.S. PATENT DOCUMENTS

| | | | |
|---|---|---|---|
| 2006/0026590 A1* | 2/2006 | Berenberg et al. | 717/175 |
| 2006/0167981 A1* | 7/2006 | Bansod et al. | 709/203 |
| 2008/0127175 A1* | 5/2008 | Naranjo et al. | 717/174 |
| 2009/0265586 A1* | 10/2009 | Fitoussi et al. | 717/175 |
| 2010/0138823 A1* | 6/2010 | Thornley | 717/174 |
| 2011/0041124 A1* | 2/2011 | Fishman et al. | 717/170 |
| 2013/0047092 A1* | 2/2013 | She | 715/753 |
| 2013/0047150 A1* | 2/2013 | Malasky et al. | 717/176 |
| 2013/0225148 A1* | 8/2013 | Ryu et al. | 455/418 |
| 2013/0346958 A1* | 12/2013 | Cohen et al. | 717/170 |
| 2014/0019416 A1* | 1/2014 | Chang et al. | 707/647 |
| 2014/0173578 A1* | 6/2014 | Ku et al. | 717/169 |
| 2014/0181803 A1* | 6/2014 | Cooper et al. | 717/178 |
| 2014/0297787 A1* | 10/2014 | Baugh et al. | 709/217 |
| 2014/0310699 A1* | 10/2014 | Wu et al. | 717/170 |
| 2014/0358264 A1* | 12/2014 | Long et al. | 700/94 |
| 2015/0007165 A1* | 1/2015 | Zhao et al. | 717/174 |
| 2015/0089491 A1* | 3/2015 | Wang et al. | 717/175 |

FOREIGN PATENT DOCUMENTS

| | | |
|---|---|---|
| CN | 102314365 A | 1/2012 |
| CN | 102508677 A | 6/2012 |

OTHER PUBLICATIONS

Qingshan et al., "Controlling Symbol Visibility for Shared Libraries: Part 2—Advanced Knowledge with IBM XL C/C++ V13 Compiler", Sep. 9, 2014, IBM Corporation, pp. 1-12; <https://www.ibm.com/developerworks/aix/library/au-aix-symbol-visibility-part2/>.*

Linares-Vásquez et al., "Revisiting Android Reuse Studies in the Context of Code Obfuscation and Library Usages", 2014 ACM, MSR'14, May 31, 2014, pp. 242-251; <http://dl.acm.org/results.cfm?h=1&source_query=&&cfid=507756040&cftoken=20800184>.*

Tucker et al., "OPIUM: Optimal Package Install/Uninstall Manager", 2007 IEEE, ICSE'07, May 20, 2007, pp. 1-10; <http://ieeexplore.ieee.org/stamp/stamp.jsp?tp=&arnumber=4222580>.*

International Search Report PCT/CN2013/090322, dated Mar. 27, 2014.

* cited by examiner

METHOD, SYSTEM AND SERVER FOR DOWNLOADING INSTALLATION PACKAGE

CROSS-REFERENCE TO RELATED APPLICATIONS

This application is a continuation of International Application No. PCT/CN2013/090322, filed on Dec. 24, 2013, which claims priority to Chinese Patent Application No. 201310177771.3, filed on May 14, 2013, both of which are hereby incorporated herein by reference in their entireties.

FIELD OF THE TECHNOLOGY

The present disclosure belongs to the technical field of data processing and particularly relates to an installation package downloading method with a system and a server.

BACKGROUND

As an open-source operating system, the Android system has been widely applied in various terminal apparatuses (such as mobile phones and tablet PCs). Android Package (APK) refers to the software package containing some installation files (such as a dex file) required by the Android system. The dynamic link library (DLL) is a library containing codes and data which may be used by the application programs of the terminal apparatus.

SUMMARY

The embodiments of the present disclosure provide an installation package downloading method. The method includes: receiving request information for downloading the installation package from a hardware client; acquiring the installation package and a dynamic link library related to the installation package upon the receipt of the request information for downloading the installation package; compiling the dynamic link library that has been acquired to reduce a size of the dynamic link library; packing the dynamic link library and the installation package, wherein the size of the dynamic link library has been reduced; and transmitting the dynamic link library and the installation package to the hardware client.

In another aspect of the present disclosure, a server is disclosed. The server includes: one or more processors; memory; and one or more program units stored in the memory and to be executed by the one or more processors, the one or more program units comprising: an information acquiring unit configured to receive request information for downloading the installation package transmitted by a hardware client and to acquire the installation package and a dynamic link library that is related to this installation package upon the receipt of the request information for downloading the installation package; a dynamic link library compiling unit configured to compile the dynamic link library that has been acquired to reduce a size of the dynamic link library; an installation package transmitting unit configured to pack the dynamic link library and the installation package wherein the size of the dynamic link library is reduced, and transmit the dynamic link library and the installation package to the hardware client.

The current disclosure also provides a system with a hardware client that includes a processor and a server that includes a processor; wherein the hardware client is configured to transmit request information for downloading the installation package to the server; wherein the server is configured to acquire an installation package and a dynamic link library related to the installation package upon the receipt of the request information for downloading the installation package transmitted by the hardware client, compile the dynamic link library that has been acquired, reduce a size of the dynamic link library, pack the dynamic link library and the installation package wherein the size of the dynamic link library has been reduced, and transmit the dynamic link library and the installation package to the hardware client.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION OF THE EMBODIMENTS

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

The present disclosure is further described in detail in combination with the attached drawings. The disclosure provided here is only used for explaining purpose, but not used for limiting the present disclosure.

As the prior terminal apparatus based on the Android system will consider the use of each application program in the terminal apparatus at the time of downloading the APK, the complete DLL will be downloaded along with the APK; however, the DLL may have a certain size, ranging from several thousand bytes (Kb), to several megabytes (M) and even dozens of megabytes, which may cause the terminal apparatus to consume relatively more time and data flow at the time of downloading the APK.

The purpose of the embodiments of the present disclosure is to disclose an installation package downloading method for the purpose of resolving the problem whereby the prior terminal apparatus will consume relatively more time and data flow at the time of downloading the APK.

In comparison with the prior art, the embodiments of the present disclosure have the following beneficial effects: In the embodiments of the present disclosure, at the time when the client side is downloading the installation package, the server side first compiles and shrinks the dynamic link library related to the installation package, then packs the dynamic link library with the installation package and transmits them to the client side. As the size of the dynamic link library has been reduced, the time and data flow that will be consumed at the time of downloading may be effectively reduced.

Figure 1:
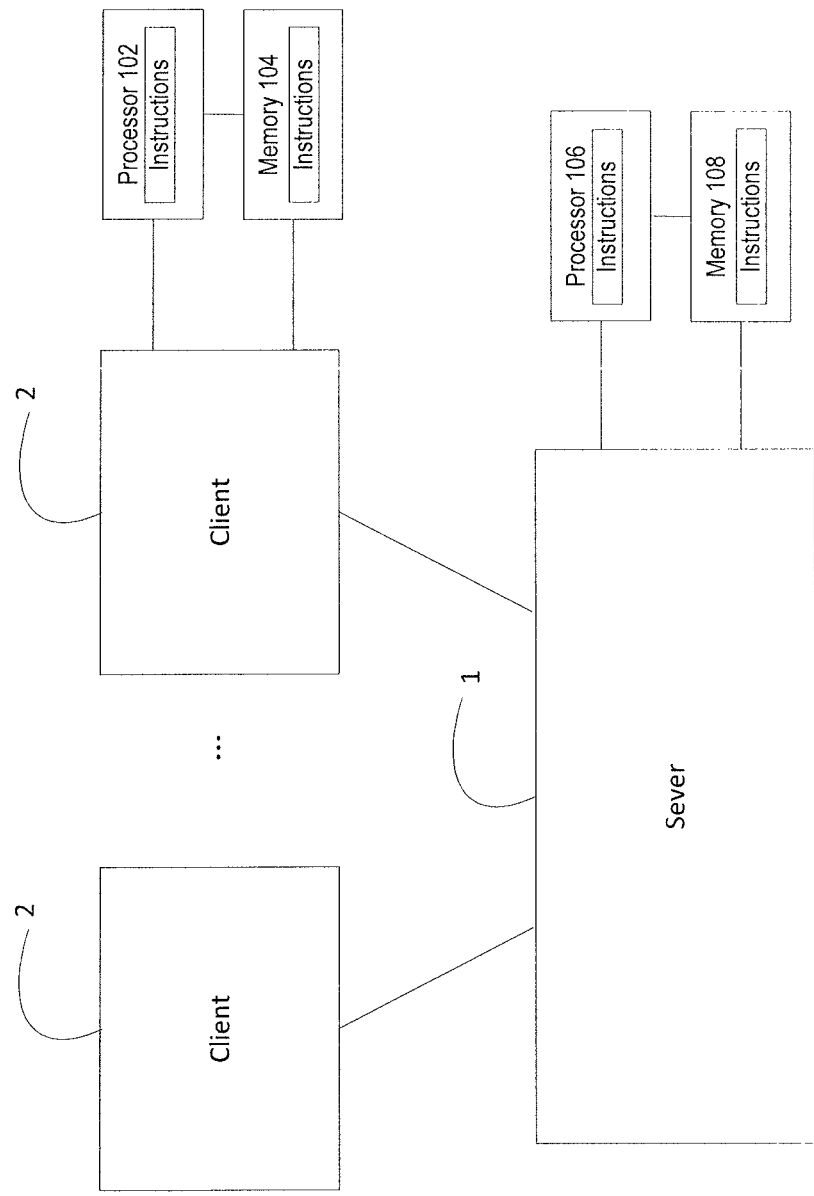
FIG. 1 shows a network architecture diagram of an installation package downloading system.

FIG. 1 illustrates a network architecture of the installation package downloading system of the present disclosure. The installation package downloading method described the present disclosure may be applied to the installation package downloading system, and only the related part is shown for convenient explanation.

As shown in FIG. 1, this installation package downloading system includes a server 1 and at least one client 2, and the server 1 and client 2 connect communication through a network.

The server 1 may be a single server or a server which is composed of several functional servers together.

The client 2 may be any terminal apparatus which has a network connection function, including but not limited to the mobile phone, the computer, or any computing device having a processor. The client 2 may be a hardware client or a software client.

The client 2 may transmit the installation package downloading request information to the server 1 after having received the installation package downloading instruction transmitted by the user or the triggering information, which has been generated according to the preset time interval, of downloading the installation package.

The client 2 may be referred as client, client side which could be one or many computer, mobile handset or any device that contains memory 104 and processor 102 as shown in FIG. 1. The server may be referred as server or server side which could be one or many computer, mobile handset or any device that memory 104 and processor 102 as shown in FIG. 1. Client side and client may be used exchangeable throughout this disclosure. Server side and server may be used exchangeable throughout this disclosure. The server 1 may be a hardware server or a software server.

The installation package of the server side may be continuously updated, so the user may preset a time interval (such as once per week) for downloading the installation package, and the client side will automatically transmit the installation package downloading request information to the server side at the time when the downloading time interval has been reached. Wherein, the downloading request information includes information, such as a unique identifier of the installation package to uniquely identify the installation packaged to be downloaded.

When the server 1 may have received the installation package downloading request information transmitted by the client 2, the server may acquire the corresponding installation package and the dynamic link library related to this installation package according to the unique identifier in the downloading request information; compile the dynamic link library, which has been acquired, to reduce the size of the dynamic link library; pack the dynamic link library, the size of which has been reduced, with the installation package and then transmit them to the client 2.

In order to improve downloading efficiency, the server 1 may store the installation package and the dynamic link library related to this installation package to the same path. For example, the installation package and the dynamic link library may be stored in a common directory on the sever side for downloading to the client side.

In addition, as the installation package of the server side may be continuously updated, in order to conserve the downloading data flow and improve the downloading efficiency, the server side may further make the installation package of the updated part into another compressed package so that the client side only needs to download the compressed package of the updated part, but not the whole compressed package, at the time of downloading the installation package. For example, the installation package and the dynamic link library may be compressed before downloading to the client side.

In practical applications, the installation package downloading request information may further carry a timestamp, and the timestamp is configured to indicate the time for downloading the installation package. After the server side may have received the installation package downloading request information including the timestamp, the server side may determine whether there is any new installation package or not according to the timestamp; if there is any, then the server side may pack the new installation package with the dynamic link library, the size of which may have been reduced, and then may transmit them to the client side.

The mode whereby the server side reduces the size of the dynamic link library comprises, but is not limited to, the following two modes:

Mode 1: The server side compiles and modifies the export function in the dynamic link library which has been acquired, and adds the compilation option to the export function, which has been compiled and modified, so as to reduce the size of the dynamic link library.

In order to be convenient for other dynamic link libraries or application programs to call the function in this dynamic link library, the server side conducts the following compilation and modification for of the export function in the dynamic link library that has been acquired: attribute_((visibility("default"))); and adds the following compilation option to the export function that has been compiled and modified: LOCAL_CPPFLAGS:=-fvisibility=hidden-fvisibility-inlines-hidden; the export function that has been added with the compilation option will be retained in the dynamic link library, the function that has not been added with the compilation option will be deleted, or only the function name will be retained so that the size of the dynamic link library may be reduced.

The dynamic link library generally comprises the export function and a private function; the export function is the function which is accessed by an external executable program, and the private function is an internal function in the dynamic link library and may not be accessed by the external executable program.

Mode 2: The server side compiles the dynamic link library, which has been acquired, to make the dynamic link library, which has been compiled, only include an export table, wherein the export table includes the names of all the exportable functions. In this mode, the export table may include at least one name of at least one exportable function.

In order to reduce the size of the dynamic link library but not to affect the function of the dynamic link library (the dynamic link library has such a function but cannot run the full function), the size of which has been reduced, the system compiles the dynamic link library (the specific compilation may be deleting files in the dynamic link library except for the export table) to make the compiled dynamic link library only include the export table containing the function name.

Although the dynamic link library that has been compiled only includes the export table containing the function name, other dynamic link libraries or application programs dependent on this dynamic link library may still start, because the dynamic link libraries or application programs mainly check whether the required function exists or not at the time of starting. Those dynamic link libraries or application programs dependent on this dynamic link library will start if the required function exists.

Furthermore, after the server 1 packs the dynamic link library, the size of which has been reduced, with the installation package and then transmits the dynamic link library and the installation package to the client 2, the system may further comprises:

the client 2 receives the installation package returned by the server 1 and outputs the prompt information at the time when the application program of the client 2 needs to call the function of the dynamic link library in the installation package under the condition that the function does not exist or that only the function name of the function exists in the dynamic link library. The prompt information prompts the user to download the complete dynamic link library.

The complete dynamic link library includes all the functions required by the application program of the client side. However, through the processing according to Mode 1 or Mode 2, i.e., deleting the function which has not been added with the compilation option, or only retaining its function name, or only retaining the export table, which includes the function name, in the dynamic link library, the function required by the application program may not exist, or only the function name of the required function exists, in the dynamic link library which has been processed.

In order to strengthen the practicality, the system does not recommend the automatic downloading of the complete dynamic link library and requires the user to give a confirmation before the downloading (for example, the user may choose to download the dynamic link library when the client side is idle), so the client side needs to download the complete dynamic link library from the server side only after having received an instruction, which has been transmitted by the user, to download the complete dynamic link library.

As shown in FIG. 1, both the client side and the sever side may be coupled with a processor 102 and a memory 104. The method steps disclosed in this disclosure may be embodied in the instructions. The instructions that may be stored in the memory 104 may be executed by the processor 102.

The application scenarios disclosed are only used for explaining the present disclosure, but not used for limiting the protective scope of the present disclosure.

Figure 2:
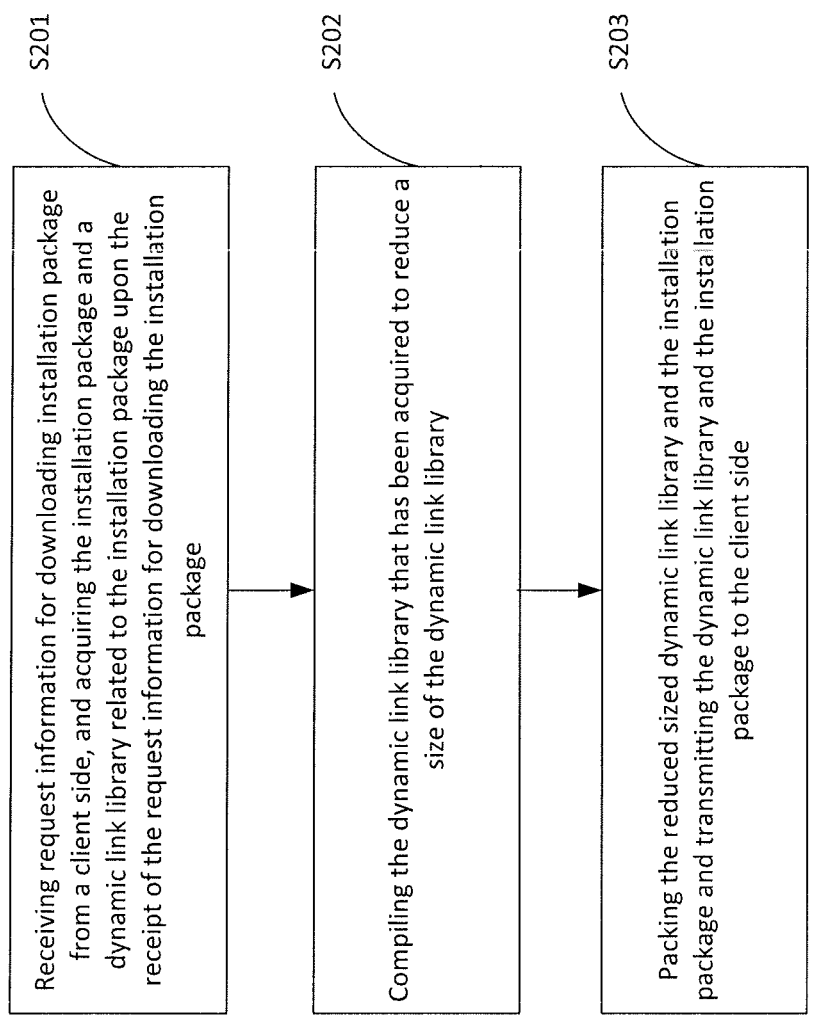
FIG. 2 shows a flow diagram of an installation package downloading method of the present disclosure.

FIG. 2 shows a flow of the installation package downloading method. The execution subject of this method may be the server 1 in FIG. 1, and the process of this method is described in detail below:

In the step S201, receiving the installation package downloading request information transmitted by the client side, and acquiring the installation package and the dynamic link library related to this installation package upon the receipt of the installation package downloading request information.

The client side may transmit the installation package downloading request information to the server side after having received an installation package downloading instruction transmitted by the user or the triggering information, which has been generated according to the preset time interval, of downloading the installation package, and the server side acquires the installation package and the dynamic link library related to this installation package upon the receipt of the installation package downloading request information.

In order to improve the downloading efficiency, the server side may store the installation package and the dynamic link library related to this installation package to the same path in advance.

In the step S202, compiling the dynamic link library that has been acquired to reduce a size of the dynamic link library.

The mode of reducing the size of the dynamic link library comprises, but is not limited to, the following two modes:

Mode 1: Compiling and modifying the export function in the dynamic link library which has been acquired, and adding the compilation option to the export function, which has been compiled and modified, so as to reduce the size of the dynamic link library;

Mode 2: Compiling the dynamic link library, which has been acquired, to make the dynamic link library, which has been compiled, only include an export table, wherein the export table includes the names of all the exportable functions.

In the step S203, packing the reduced sized dynamic link library and the installation package and transmitting the dynamic link library and the installation package to the client side.

As the installation package of the server side may be continuously updated, in order to conserve the downloading data flow and improve the downloading efficiency, the server side may further make the installation package of the updated part into another compressed package; after it has received the installation package downloading request information including the timestamp (the timestamp is configured to indicate the time for downloading the installation package), the server side determines whether there is any installation package of the updated part or not according to the timestamp; if there is any, then it will pack the installation package of the updated part and the dynamic link library, the size of which has been reduced, and transmit them to the client side. The client side outputs the prompt information upon the receipt of the installation package, which has been returned by the server side, at the time when the application program of the client side needs to call the function of the dynamic link library in the installation package under the condition that the function does not exist or that only the function name of the function exists in the dynamic link library so as to prompt the user to download the complete dynamic link library.

As the embodiment of the present disclosure may reduce the size of the dynamic link library, which is downloaded together with the APK, at the time of downloading the APK, the problem whereby the prior terminal apparatus needs to consume relatively more time and data flow at the time of downloading the APK may be effectively resolved.

Figure 3:
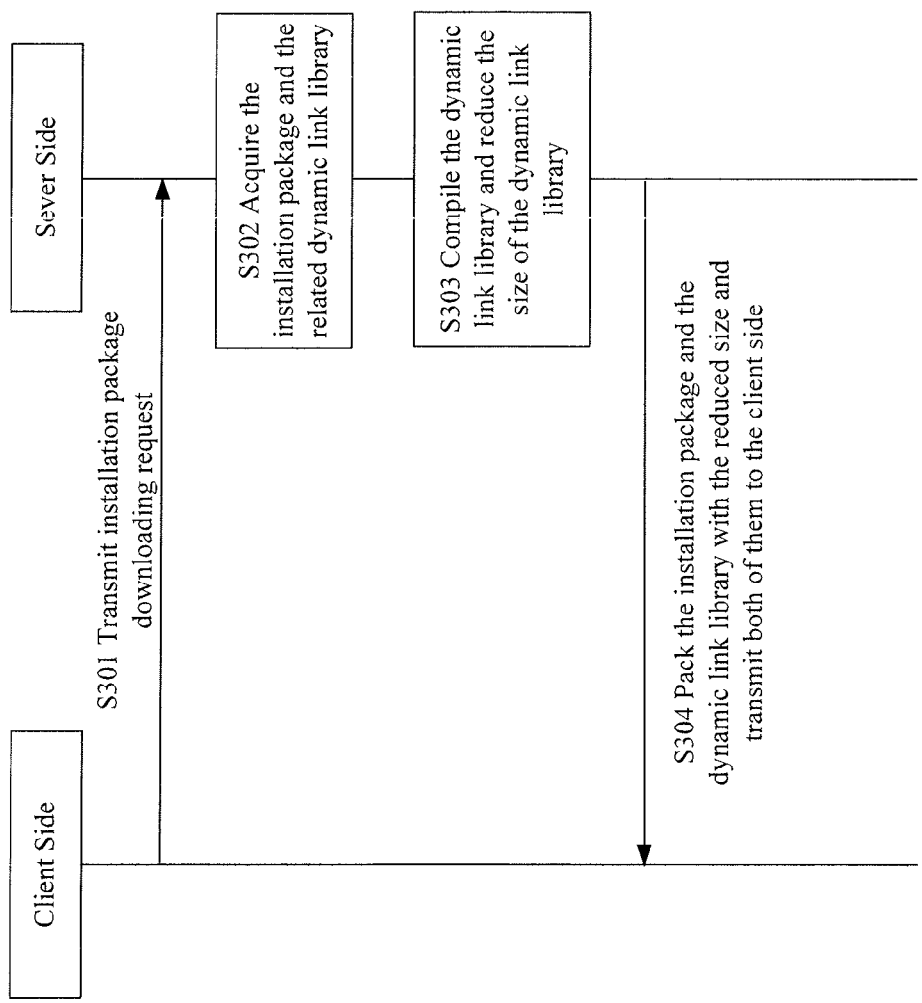
FIG. 3 shows an interaction flow diagram of an installation package downloading method disclosed in the present disclosure.

FIG. 3 shows an interaction flow of the installation package downloading method. The process of this method is described in detail below:

In the step S301, the client side transmits the installation package downloading request information to the server side.

The client side transmits the installation package downloading request information to the server side after having received an installation package downloading instruction transmitted by the user or the triggering information, which has been generated according to the preset time interval, of downloading the installation package.

In the step S302, the server side acquires the installation package and the dynamic link library related to this installation package upon the receipt of the installation package downloading request information transmitted by the client side.

In order to improve the downloading efficiency, the server side may store the installation package and the dynamic link library related to this installation package to the same path in advance.

In the step S303, the server side compiles the dynamic link library, which has been acquired, to reduce the size of the dynamic link library.

The mode whereby the server side reduces the size of the dynamic link library comprises, but is not limited to, the following two modes:

Mode 1: The server side compiles and modifies the export function in the dynamic link library which has been acquired and adds the compilation option to the export function, which has been compiled and modified, so as to reduce the size of the dynamic link library.

In order to be convenient for other dynamic link libraries or application programs to call the function in this dynamic link library, the server side may conduct the following compilation and modification for the export function in the dynamic link library that has been acquired: attribute_((visibility("default"))); and may add the following compilation option to the export function that has been compiled and modified: LOCAL_CPPFLAGS:=-fvisibility=hidden-fvisibility-inlines-hidden. The export function that has been added with the compilation option will be retained in the dynamic link library, the function that has not been added with the compilation option will be deleted, or only the function name will be retained so that the size of the dynamic link library may be reduced.

The dynamic link library generally comprises the export function and a private function; the export function is the function which is accessed by an external executable program, and the private function is an internal function in the dynamic link library and cannot be accessed by the external executable program.

Mode 2: The server side compiles the dynamic link library, which has been acquired, to make the dynamic link library, which has been compiled, only include an export table, wherein the export table includes the names of all the exportable functions.

In order to reduce the size of the dynamic link library but not to affect the function of the dynamic link library (the dynamic link library has such a function but cannot run the full function), the size of which has been reduced, the server side compiles the dynamic link library (the specific compilation may be deleting files in the dynamic link library except for the export table) to make the dynamic link library, which has been compiled, only include the export table containing the function name.

Although the dynamic link library that has been compiled only includes the export table containing the function name, other dynamic link libraries or application programs dependent on this dynamic link library may still start, because the dynamic link libraries or application programs mainly check whether the required function exists or not at the time of starting, and they will start if the required function exists.

In the step S304, the server side packs (i.e., compresses) the dynamic link library, the size of which has been reduced, with the installation package and transmits them to the client side.

As the installation package of the server side may be continuously updated, in order to conserve the downloading data flow and improve the downloading efficiency, the server side may further make the installation package of the updated part into another compressed package; after it has received the installation package downloading request information including the timestamp (the timestamp is configured to indicate the time for downloading the installation package), the server side determines whether there is any installation package of the updated part or not according to the timestamp; if there is any, then it will pack the installation package of the updated part and the dynamic link library, the size of which has been reduced, and transmit them to the client side. The client side outputs the prompt information upon the receipt of the installation package, which has been returned by the server side, at the time when the application program of the client side needs to call the function of the dynamic link library in the installation package under the condition that the function does not exist or that only the function name of the function exists in the dynamic link library so as to prompt the user to download the complete dynamic link library.

When the client side downloads the installation package, the server side may reduce the size of the dynamic link library related to the installation package through multiple modes so as to reduce the time and data flow to be consumed at the time of the downloading and improve the downloading efficiency.

Figure 4:
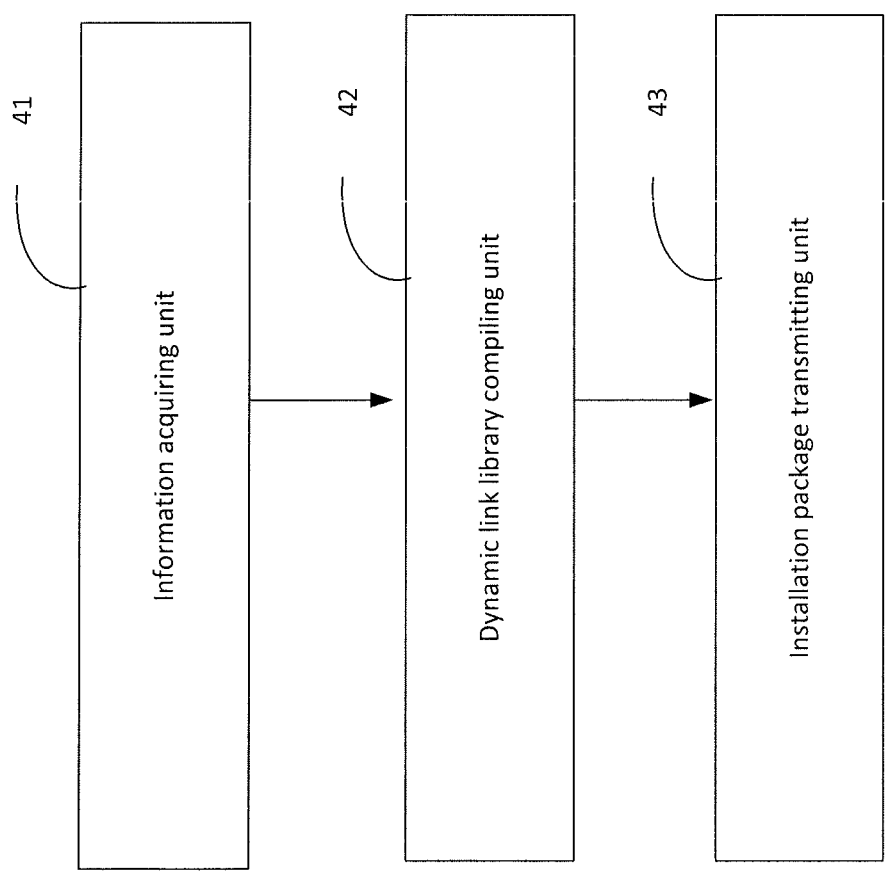
FIG. 4 shows a composition structure diagram of a server disclosed in the present disclosure.

FIG. 4 shows a composition structure of the present disclosure. FIG. 4 only shows the part related to the present disclosure for convenient explanation.

This server may be applied to the installation package downloading system.

This server comprises an information acquiring unit 41, a dynamic link library compiling unit 42 and a installation package transmitting unit 43. Wherein, the specific function of each unit is described below:

The information acquiring unit 41 is configured to receive the installation package downloading request information transmitted by the client side and to acquire the installation package and the dynamic link library related to this installation package upon the receipt of the installation package downloading request information;

The client side transmits the installation package downloading request information to the server after having received an installation package downloading instruction transmitted by a user or the triggering information, which has been generated according to a preset time interval, of downloading the installation package, and the server acquires the installation package and the dynamic link library related to this installation package through the information acquiring unit 41 upon the receipt of the installation package downloading request information.

The dynamic link library compiling unit 42 is configured to compile the dynamic link library, which has been acquired, to reduce the size of the dynamic link library;

The installation package transmitting unit 43 is configured to pack the dynamic link library, the size of which has been reduced, with the installation package and then to transmit them to the client side to make the client side output the prompt information upon the receipt of the installation package returned by the server side and at the time when the application program of the client side needs to call the function of the dynamic link library in the installation package under the condition that the function does not exist or that only the function name of the function exists in the dynamic link library so as to prompt the user to download the complete dynamic link library.

Furthermore, the dynamic link library compiling unit 42 is specifically configured to:

compile and modify the export function in the dynamic link library which has been acquired and to add the compilation option to the export function, which has been compiled and modified, so as to reduce the size of the dynamic link library;

or, compile the dynamic link library, which has been acquired, to make the dynamic link library, which has been compiled, only include an export table, wherein the export table includes the names of all the exportable functions.

Those of skill in the art may clearly understand that the exemplification with the division of the abovementioned various functional units and modules is only provided for the purpose of convenient and simple description. In practical applications, the abovementioned functions may be allocated for completion by different functional units and modules as required, i.e., the internal structure of the server is divided into different functional units or modules so as for all or part of the functions described above to be completed. In the embodiments, the various functional units or modules may be integrated into one processing unit; or each unit may also separately exist physically; or two or more units may be integrated into one unit, and the abovementioned integrated units or modules may be realized in the form of hardware or functional unit of software. In addition, the specific names of the various functional units and modules are merely used for conveniently distinguishing between each other, but not used for limiting the protective scope of this application. For specific working processes of the units and modules in the abovementioned apparatus, please refer to the corresponding processes in the embodiments of the aforementioned method, and they will not be described with unnecessary detail here.

In conclusion, in the embodiments of the present disclosure, when the client side downloads the installation package, the server side may reduce the size of the dynamic link library related to the installation package through the mode. For example, compiling and modifying the export function in the dynamic link library that has been acquired and adding the compilation option to the export function which has been compiled and modified or acquiring the dynamic link library which only includes the export table, directly through the compilation. Such steps may reduce the size of the dynamic link library so as to reduce the time and data flow to be consumed at the time of downloading and improve the downloading efficiency.

Those of ordinary skill in the art may further understand that all or some of the steps in the methods may be completed via programs, which instruct related hardware. The program may be stored in a type of computer-readable storage medium, and the storage medium comprises ROM/RAM, disk, compact disc, etc.

The above contents are further explanations of the present disclosure in detail in combination with the embodiments, and the embodiments of the present disclosure cannot be regarded to be restricted to these explanations. For those of ordinary skill in the technical field to which the present disclosure belongs, a number of equivalent substitutions or obvious variations with the same performance or purpose under the precondition that there is no deviation from the conception of the present disclosure shall all be deemed as covered by the scope of patent protection as defined in the submitted claims of the present disclosure.

What is claimed is:

1. A method for downloading an installation package, comprising:
   receiving request information for downloading the installation package from a hardware client;
   acquiring the installation package and a dynamic link library related to the installation package upon the receipt of the request information for downloading the installation package;
   compiling the dynamic link library that has been acquired to reduce a size of the dynamic link library, wherein the reduced size of the dynamic link library comprises a function name without a function, wherein the step of compiling further comprises compiling the dynamic link library that has been acquired to include only an export table, wherein the export table comprises at least one name of at least one exportable function;
   packing the dynamic link library and the installation package, wherein the size of the dynamic link library has been reduced; and
   transmitting the dynamic link library and the installation package to the hardware client.

2. The method according to claim 1, wherein the step of compiling further comprises:
   compiling and modifying an export function in the dynamic link library that has been acquired; and
   adding a compilation option to the export function that has been compiled and modified to reduce the size of the dynamic link library.

3. The method according to claim 1, wherein the request information comprises a unique identifier that identifies the installation package to be downloaded.

4. The method according to claim 1, wherein the installation package and the dynamic link library are stored in a common directory.

5. The method according to claim 1, wherein the request information comprises a timestamp that is configured to indicate a time for downloading the installation package.

6. The method according to claim 1, wherein the installation package and the dynamic link library are compressed before downloading to the hardware client.

7. A server, comprising:
   one or more processors;
   memory; and
   one or more program units stored in the memory and to be executed by the one or more processors, the one or more program units comprising:
   an information acquiring unit configured to receive request information for downloading the installation package transmitted by a hardware client and to acquire the installation package and a dynamic link library that is related to this installation package upon the receipt of the request information for downloading the installation package;
   a dynamic link library compiling unit configured to compile the dynamic link library that has been acquired to reduce a size of the dynamic link library, wherein the reduced size of the dynamic link library comprises a function name without a function, wherein the dynamic link library has been acquired to include only an export table, wherein the export table comprises at least one name of at least one exportable function;
   an installation package transmitting unit configured to pack the dynamic link library and the installation package wherein the size of the dynamic link library is reduced, and transmit the dynamic link library and the installation package to the hardware client.

8. The server according to claim 7, wherein the dynamic link library compiling unit is configured to compile and modify an export function in the dynamic link library that has been acquired, add a compilation option to the export function to reduce the size of the dynamic link library, wherein the export function is compiled and modified.

9. The server according to claim 7, wherein the dynamic link library compiling unit is configured to:
   compile the dynamic link library that has been acquired to include the export table, wherein the export table comprises the at least one name of the at least one exportable function.

10. The server according to claim 7, wherein the request information for downloading the installation package comprises a unique identifier that identifies the installation package to be downloaded.

11. The server according to claim 7, wherein the installation package and the dynamic link library are stored to a common directory on the server.

12. The server according to claim 7, wherein the request information for downloading the installation package comprises a timestamp that is configured to indicate a time for downloading the installation package.

13. The server according to claim 7, wherein the installation package and the dynamic link library are compressed for downloading.

14. An installation package downloading system, comprising:
- a hardware client that includes a processor and a server that includes a processor;
- wherein the hardware client is configured to transmit request information for downloading the installation package to the server;
- wherein the server is configured to acquire an installation package and a dynamic link library related to the installation package upon the receipt of the request information for downloading the installation package transmitted by the hardware client, compile the dynamic link library that has been acquired, reduce a size of the dynamic link library wherein the reduced size of the dynamic link library comprises a function name without a function, wherein the dynamic link library has been acquired to include only an export table, wherein the export table comprises at least one name of at least one exportable function, pack the dynamic link library and the installation package wherein the size of the dynamic link library has been reduced, and transmit the dynamic link library and the installation package to the hardware client.

15. The system according to claim 14, wherein the hardware client is configured to:
transmit the request information for downloading the installation package to the server after receiving an installation package downloading instruction that is transmitted by a user or triggering information, wherein the triggering information is generated according to a preset time interval for downloading the installation package.

16. The system according to claim 14, wherein the server is configured to:
compile and modify an export function in the dynamic link library that has been acquired, and add a compilation option to the export function to reduce the size of the dynamic link library, wherein the export function has been compiled and modified.

17. The system according to claim 14 or claim 16, wherein the server is configured to:
compile the dynamic link library that has been acquired to include the export table, wherein the export table comprises the at least one name of the at least one exportable function.

18. The system according to claim 14, wherein the hardware client is further configured to:
receive the installation package that is received from the server, output prompt information when an application program of the hardware client calls a function of the dynamic link library in the installation package and the function does not exist or only a function name of the function exists in the dynamic link library, and prompt a user to download the dynamic link library.

* * * * *